United States Patent
Lehmann et al.

(10) Patent No.: US 9,649,956 B2
(45) Date of Patent: May 16, 2017

(54) VEHICLE SEAT, PARTICULARLY A MOTOR VEHICLE SEAT

(71) Applicant: JOHNSON CONTROLS COMPONENTS GMBH & CO. KG, Kaiserslautern (DE)

(72) Inventors: Marcel Lehmann, Rodenbach (DE); Lars Kramm, Trippstadt (DE); Matthias Klein, Kaiserslautern (DE); Thomas Hässel, Haschbach (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 57 days.

(21) Appl. No.: 14/442,635

(22) PCT Filed: May 27, 2013

(86) PCT No.: PCT/EP2013/060860
§ 371 (c)(1),
(2) Date: May 13, 2015

(87) PCT Pub. No.: WO2014/075819
PCT Pub. Date: May 22, 2014

(65) Prior Publication Data
US 2015/0360590 A1 Dec. 17, 2015

(30) Foreign Application Priority Data
Nov. 19, 2012 (DE) .................... 10 2012 022 862

(51) Int. Cl.
*A47C 1/00* (2006.01)
*B60N 2/30* (2006.01)
(Continued)

(52) U.S. Cl.
CPC ............ *B60N 2/305* (2013.01); *B60N 2/065* (2013.01); *B60N 2/12* (2013.01); *B60N 2/3022* (2013.01);
(Continued)

(58) Field of Classification Search
CPC .......... B60N 2/305; B60N 2/065; B60N 2/12; B60N 2/3065; B60N 2/3031; B60N 2002/445
(Continued)

(56) References Cited

U.S. PATENT DOCUMENTS

| | | | |
|---|---|---|---|
| 6,010,190 A | 1/2000 | Downey | |
| 7,100,984 B2 * | 9/2006 | Epaud | B60N 2/06 297/341 |

(Continued)

FOREIGN PATENT DOCUMENTS

| | | |
|---|---|---|
| DE | 1020040 08 177 A1 | 9/2004 |
| DE | 2020060 05 525 U1 | 7/2006 |

(Continued)

OTHER PUBLICATIONS

International Search Report in PCT/EP2013/060860 dated Aug. 14, 2013, 4 pages.
(Continued)

*Primary Examiner* — Laurie K Cranmer
(74) *Attorney, Agent, or Firm* — Foley & Lardner LLP

(57) ABSTRACT

A vehicle seat, particularly a motor vehicle seat, has a seat cushion and a backrest, and a seat mechanism connecting the seat cushion and/or the backrest to at least one seat rail pair. The seat rail pair has two seat rails that can be displaced relatively to one another and which can be locked together by a rail locking mechanism. The vehicle seat can be shifted by the seat mechanism from a use position to a non-use position. A coupler couples the seat mechanism and the seat
(Continued)

Figure 1:
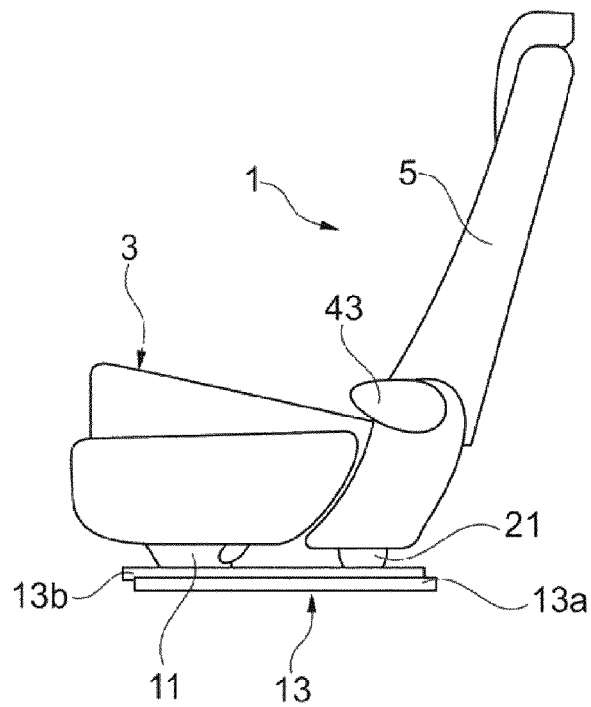

locking mechanism together in such a way that a least one seat rail pair is locked in the use position and the non-use position of the vehicle seat and is unlocked in an intermediate position of the vehicle seat located between the use position and the non-use position.

15 Claims, 7 Drawing Sheets

(51) Int. Cl.
  *B60N 2/06* (2006.01)
  *B60N 2/12* (2006.01)
  *B60N 2/44* (2006.01)
(52) U.S. Cl.
  CPC ......... *B60N 2/3031* (2013.01); *B60N 2/3065* (2013.01); *B60N 2/3093* (2013.01); *B60N 2002/445* (2013.01)
(58) Field of Classification Search
  USPC .................................... 297/331, 341, 378.12
  See application file for complete search history.

(56) References Cited

U.S. PATENT DOCUMENTS

| | | | | |
|---|---|---|---|---|
| 7,328,929 | B2* | 2/2008 | Epaud | B60N 2/3009 296/65.09 |
| 8,167,372 | B2* | 5/2012 | Hazlewood | B60N 2/0705 248/429 |
| 8,474,910 | B2* | 7/2013 | Kammerer | B60N 2/12 296/65.09 |
| 2002/0125753 | A1* | 9/2002 | Kammerer | B60N 2/0292 297/331 |
| 2004/0212237 | A1 | 10/2004 | Epaud et al. | |
| 2005/0077770 | A1* | 4/2005 | Lang | B60N 2/36 297/331 |
| 2007/0246985 | A1* | 10/2007 | Sahi | B60N 2/12 297/331 |
| 2008/0122279 | A1* | 5/2008 | Park | B60N 2/01 297/332 |
| 2008/0164740 | A1* | 7/2008 | Harper | B60N 2/045 297/331 |
| 2010/0084903 | A1 | 4/2010 | Kammerer | |
| 2011/0127818 | A1 | 6/2011 | Hazlewood | |
| 2012/0175930 | A1* | 7/2012 | Jovicevic | B60N 2/12 297/331 |
| 2013/0320729 | A1* | 12/2013 | Cooley | B60N 2/06 297/331 |

FOREIGN PATENT DOCUMENTS

| | | |
|---|---|---|
| DE | 102005022984 A1 | 11/2006 |
| JP | H11-348617 A | 12/1999 |
| JP | 2004-249109 A | 9/2004 |
| WO | WO-02/22391 A1 | 3/2002 |
| WO | WO-2012/017049 A1 | 2/2012 |

OTHER PUBLICATIONS

International Preliminary Report on Patentability and Written Opinion of the International Searching Authority dated May 28, 2015, received in International Application No. PCT/EP2013/060860, 8 pages.

Office Action dated Mar. 8, 2016, received in corresponding Japanese Application No. 2015-536025, 3 pages.

Office Action dated Jul. 14, 2016, received in corresponding Korean Application No. 10-2015-7015835 and English translation, 17 pages.

\* cited by examiner

VEHICLE SEAT, PARTICULARLY A MOTOR VEHICLE SEAT

CROSS REFERENCE TO RELATED APPLICATIONS

The present application is a U.S. National Stage of International Application No. PCT/EP2013/060860 filed on May 27, 2013, which claims the benefit of German Patent Application No. 10 2012 022 862.7 filed on Nov. 19, 2012, the entire disclosures of all of which are incorporated herein by reference.

The invention relates to a vehicle seat having the features of the preamble of claim 1.

PRIOR ART

A vehicle seat of the type mentioned in the introduction is disclosed in DE 10 2005 022 984 A1. The longitudinal adjuster of the vehicle seat remains locked if the vehicle seat is transferred from a use position into a non-use position. In order to set a different longitudinal seating position for the non-use position relative to the use position, a rail locking device which comprises a rail locking mechanism and an associated operating element has to be actively unlocked by the seat user. This is complicated and awkward, in particular if the vehicle seat located in a non-use position is intended to be displaced behind a front seat row in order to save constructional space and the accessibility to the operating element is restricted due to the front seat row.

OBJECT

The object of the invention is to improve a vehicle seat of the type mentioned in the introduction, so that it is possible to dispense with an active actuation of the rail locking device if the vehicle seat is transferred from a use position into a non-use position and the longitudinal seating position is intended to be altered at the same time.

SOLUTION

This object is achieved according to the invention by a vehicle seat having the features of claim 1.

As coupling means couple together the seat kinematic system and the rail locking mechanism such that the at least one seat rail pair is locked in the use position and in the non-use position of the vehicle seat and is unlocked in an intermediate position of the vehicle seat between the use position and the non-use position, the vehicle seat is able to be displaced in the longitudinal direction when transferred from the use position into the non-use position. The longitudinal position of the vehicle seat is locked in the non-use position so that the vehicle seat also maintains its longitudinally adjusted position even in the event of a crash and when braking and accelerating.

A coupling of simple construction may be achieved in that the vehicle seat comprises two seat rail pairs arranged parallel to one another and a rail unlocking bar which is operatively connected to the rail locking mechanisms of the two seat rail pairs such that a rotation of the rail unlocking bar actuates the rail locking mechanisms of the two seat rail pairs.

Preferably, the rail unlocking bar extends perpendicular to the two seat rail pairs and is rotatably mounted thereon or relative thereto.

The rail unlocking bar may be activated in a simple manner by the coupling means, in that at least one lever is fastened to the rail unlocking bar, said lever protruding in the radial direction from the rail unlocking bar and having a lever end for cooperating with the coupling means.

The coupling means represent an expedient means of increasing the comfort of vehicle seats, the seat kinematic system thereof comprising a front foot fastened to a second seat rail of the seat rail pair, a front rocker connecting the front foot and the seat cushion, as well as a rear foot which is able to be releasably fastened to the second seat rail and two package rockers which pivotably articulate the rear foot to the front foot. The rear foot, the front foot and the two package rockers in this case form the members of a four bar linkage connected together in an articulated manner.

By means of the four bar linkage, the rear foot may be pivoted in the direction of the front foot. A backrest fastened to the rear foot pivots with the rear foot so that the vehicle seat may be moved into a compact front position, a so-called package position. The backrest is advantageously attached to the rear foot by means of a fitting known per se, in particular an inclination adjustment fitting.

The rear foot of the vehicle seat may be safely and reliably fixed in the use position if a locking pin is provided on the second seat rail for the rear foot, a lock fastened to the rear foot being able to be locked to said locking pin.

A cost-effective kinematic coupling between the rail unlocking mechanism and the movement of the vehicle seat kinematic system may be achieved by at least one coupler which to this end has a control contour. The control contour is preferably an opening in the coupler base body into which a control element engages in the manner of a slot-pin guide. The control element may be, for example, a bolt, a pin, a cam, a sheet metal lug or any other means suitable for slotted guides and is movable within the control contour.

Preferably, the coupler, on the one hand, is rotatably attached to a lever end of the rail unlocking bar, in particular by means of a pin or a rivet and, on the other hand, is operatively connected via the control contour and the control element to a component of the seat kinematic system.

A preferred control contour comprises a slot-shaped first control portion, a slot-shaped second control portion and a catch contour positioned between the first control portion and the second control portion. The first control portion and the second control portion are preferably of linear design and arranged at an angle of, for example, 80° to one another.

When the vehicle seat is transferred from the use position into the non-use position or when transferred from the non-use position into the use position, during a first phase of the movement sequence the control element initially moves freely in the first control portion and without moving the coupler significantly until the control element, in particular a pin, comes to bear against the catch contour and thus against an end of the first control portion.

In a second phase of the movement sequence, the control element secured in the catch contour entrains the coupler whereby the coupler as a type of brace acts in an opening manner on the rail locking device. The vehicle seat may now be displaced in the longitudinal direction.

The renewed locking of the seat rail pair of the vehicle seat in an, in particular, forward longitudinally adjusted position, is preferably achieved in that at the end of the second phase of the movement sequence the coupler pivots against a stop. As a result, the coupler is not able to be pivoted further forward. The seat kinematic system and the control element coupled thereto, however, move further after applying a force exceeding a limit force onto the seat.

In the further movement sequence, therefore, the control element leaves the catch contour and enters the second control portion, wherein the coupler pivots back about the control element in the direction of its initial position and the rail unlocking bar is rotated again into a position locking the rail locking mechanism. The limit force in this case is the force which has to be overcome for releasing the control element from the catch contour and is dependent on the geometry of the catch contour and optionally a spring acting on the coupler.

Preferably, the vehicle seat comprises two coupling means of substantially the same construction, of which a first coupling means is provided for the transfer of the vehicle seat from the use position into the non-use position and a second coupling means is provided for the transfer from the non-use position into the use position. As a result, the control contours of the coupling means in each case have to be effective in only one direction of movement according to the invention and therefore may be designed in a particularly simple manner.

Advantageous embodiments which may be implemented individually or in combination with one another form the subject matter of the sub-claims.

FIGURES AND EMBODIMENT OF THE INVENTION

Figure 2:
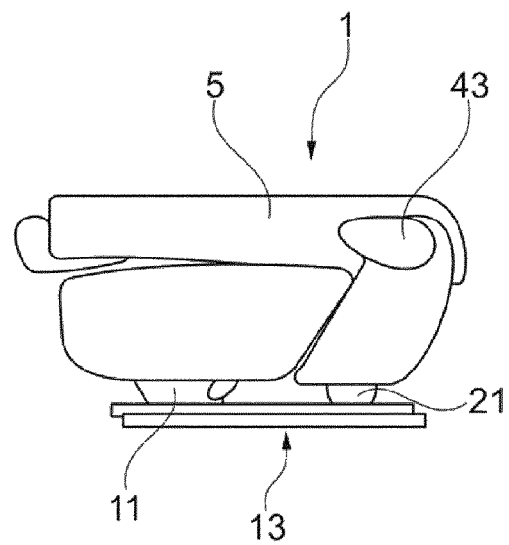
Figure 3:
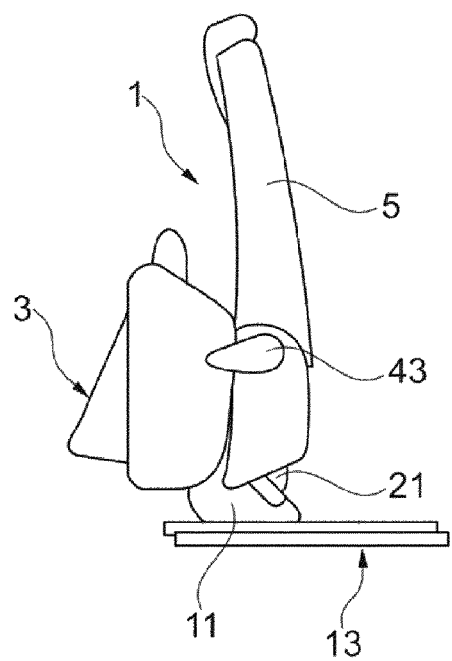
Figure 4:
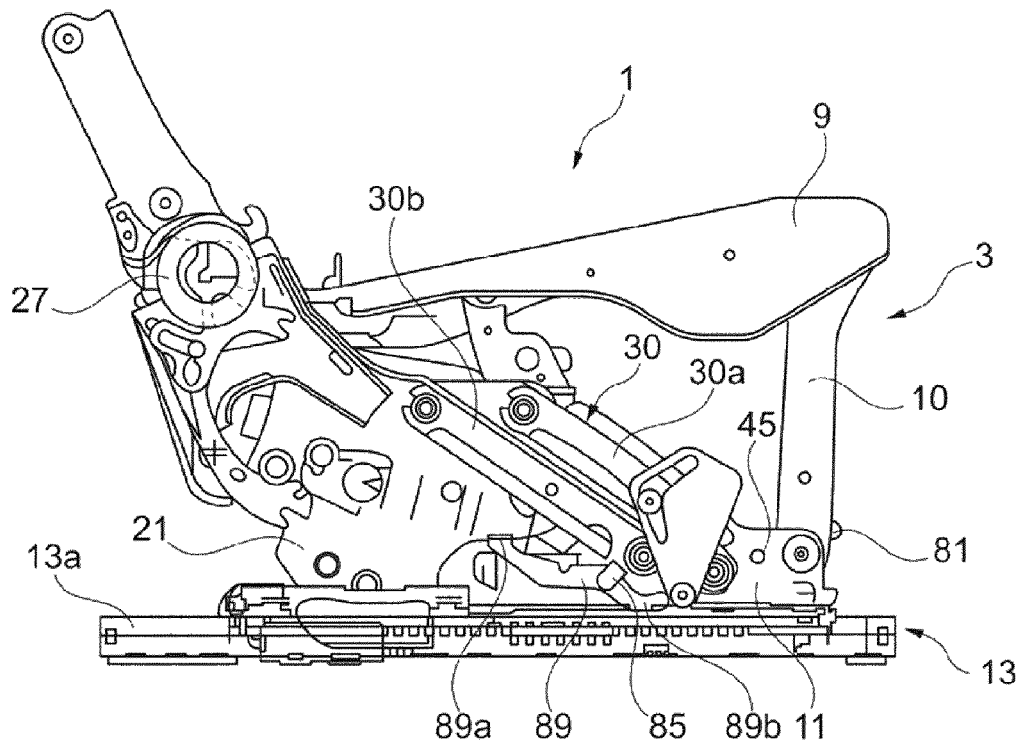
Figure 5:
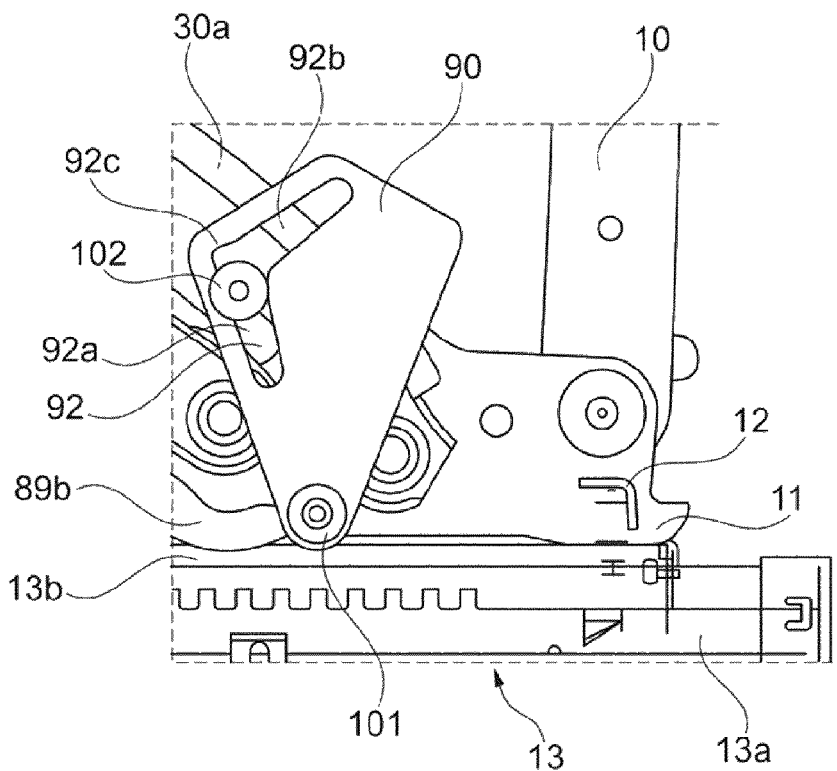
Figure 6:
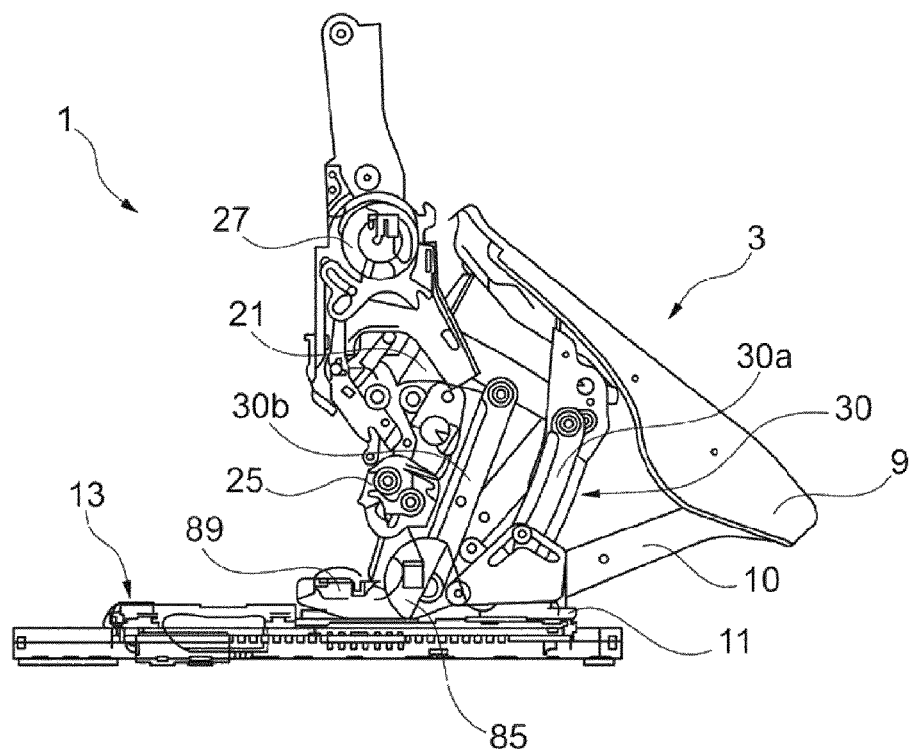
Figure 7:
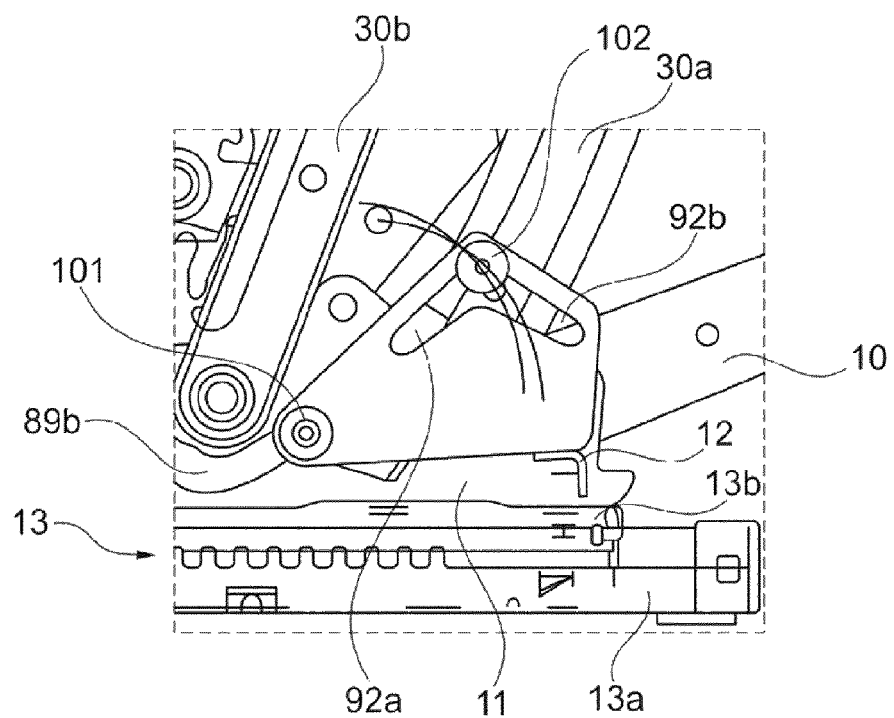
Figure 8:
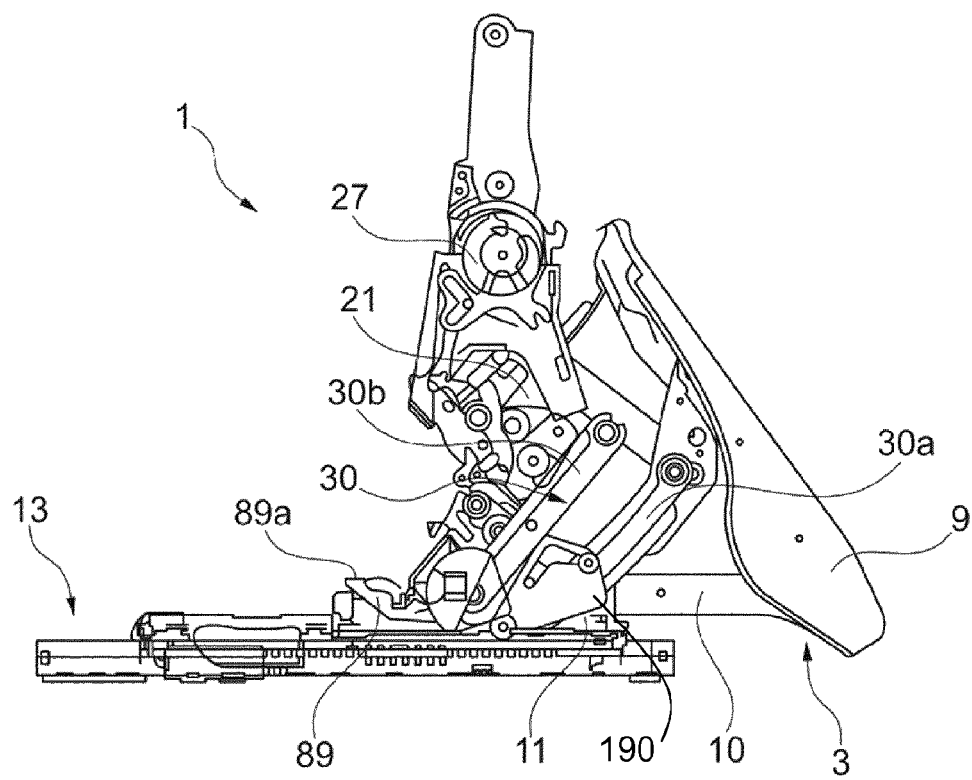
Figure 9:
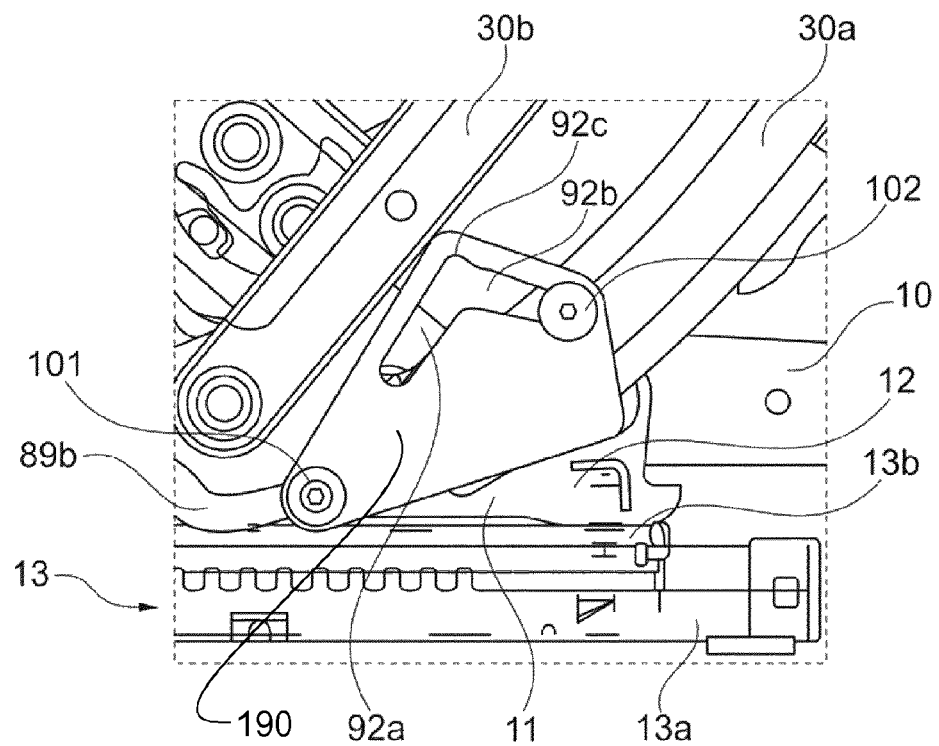
Figures 10, 11:
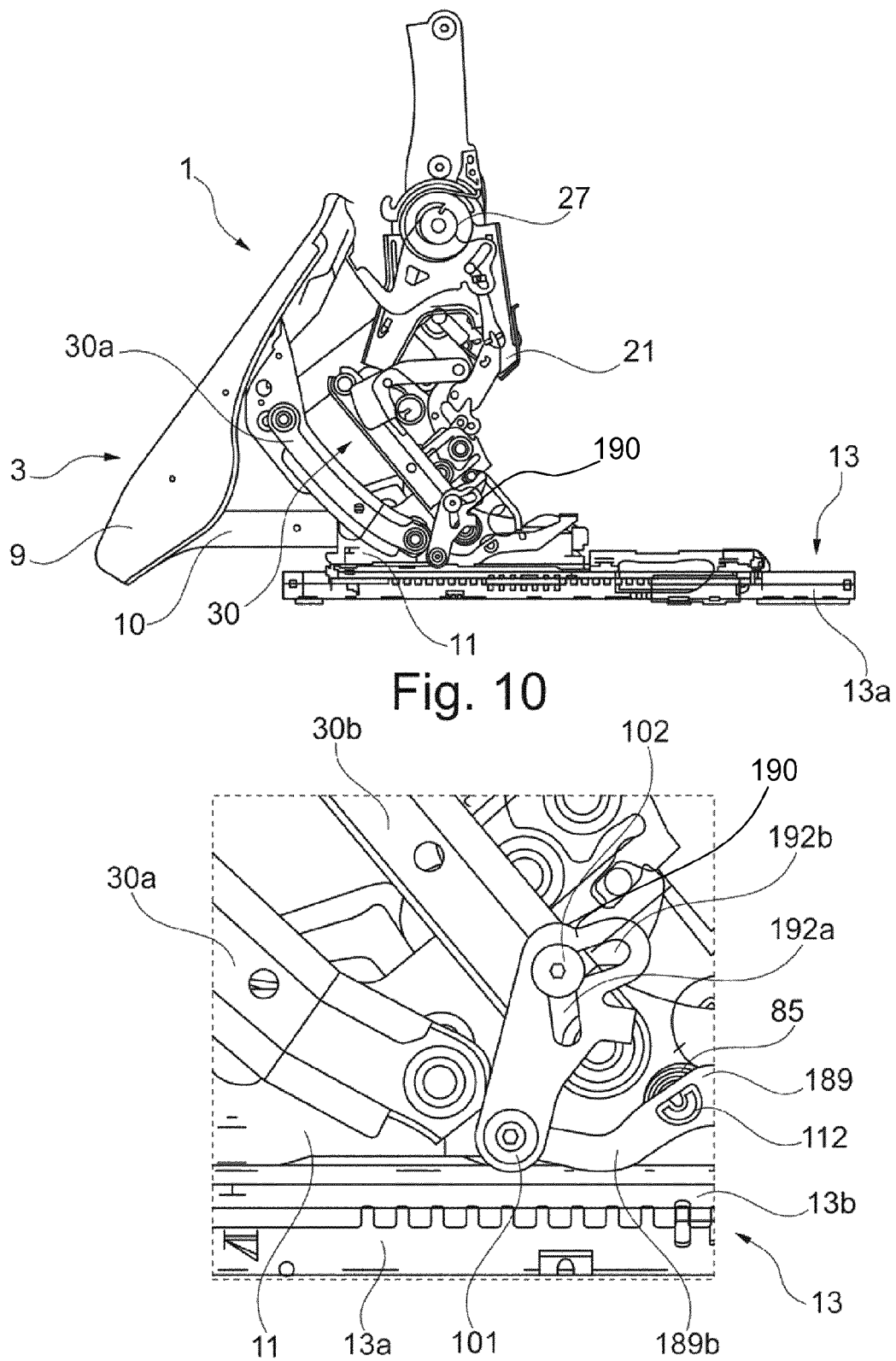
Figure 12:
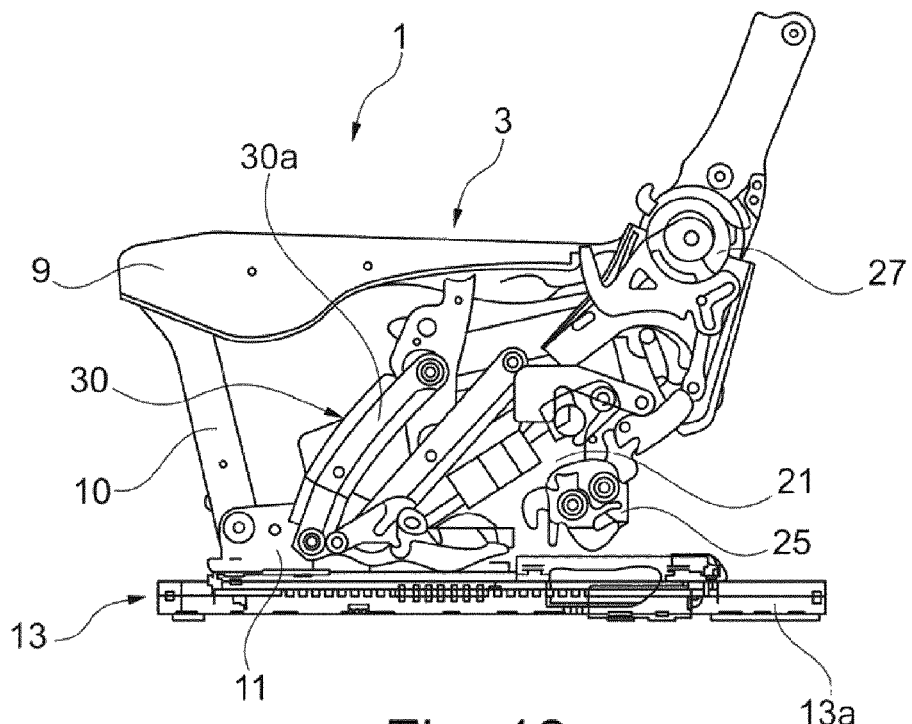
Figure 13:
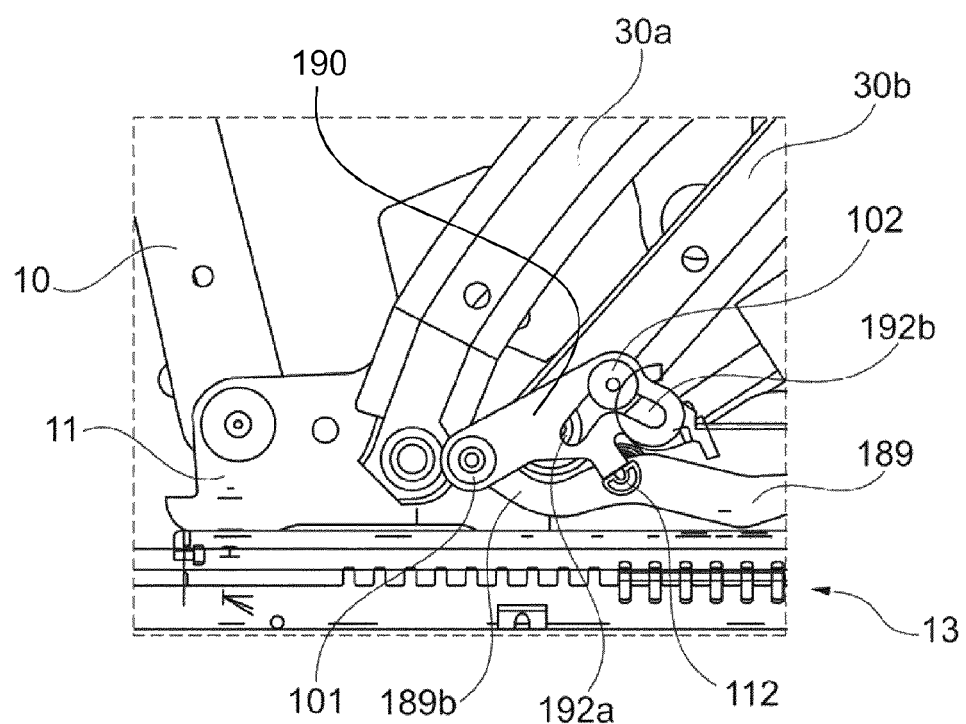
Figure 14:
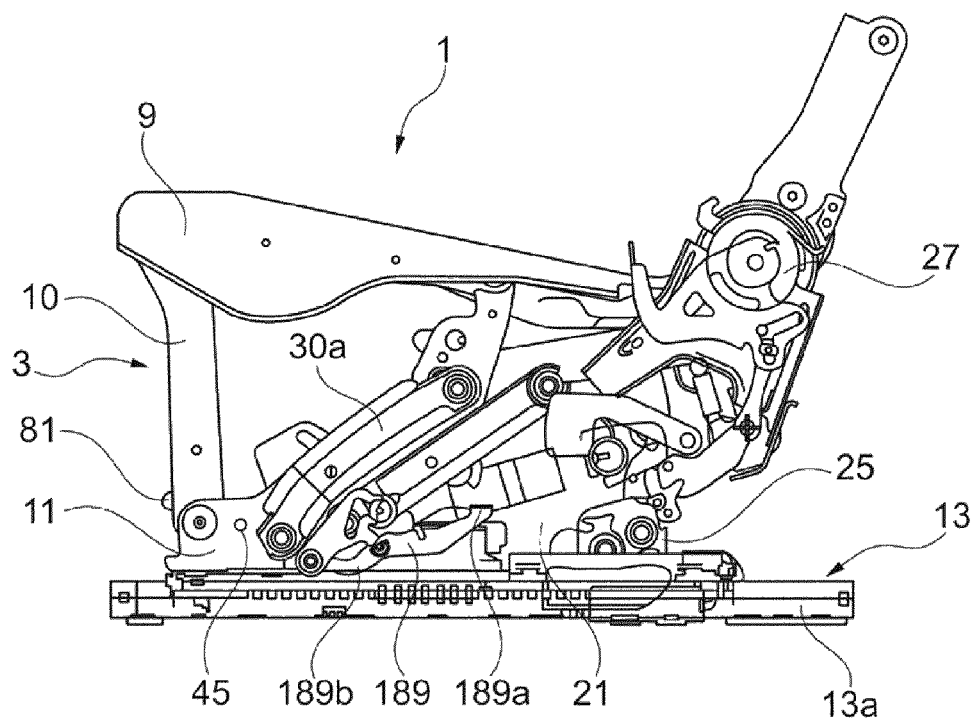
Figure 15:
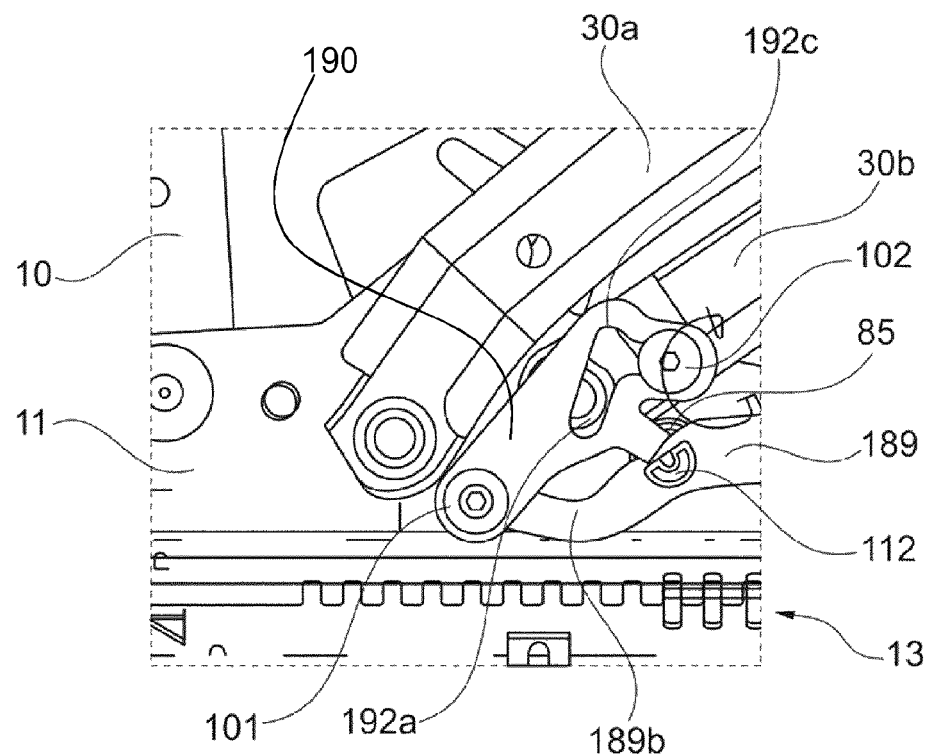

The invention is described in more detail hereinafter with reference to an advantageous exemplary embodiment shown in the figures. The invention is, however, not limited to this exemplary embodiment. In the drawings:

FIG. 1 shows a schematic side view of the exemplary embodiment in the use position, FIG. 2 shows a schematic side view of the exemplary embodiment in the floor position, FIG. 3 shows a schematic side view of the exemplary embodiment in the package position, FIG. 4 shows a side view of the right-hand side of the vehicle seat in the use position viewed in the direction of travel, FIG. 5 shows a detailed view of FIG. 4 of the coupling means, FIG. 6 shows a view corresponding to FIG. 4 in an intermediate position of the vehicle seat, FIG. 7 shows a detailed view of FIG. 6 of the coupling means, FIG. 8 shows a view corresponding to FIG. 4 in the package position of the vehicle seat, FIG. 9 shows a detailed view of FIG. 8 of the coupling means, FIG. 10 shows a side view of the left-hand side of the vehicle seat in the package position viewed in the direction of travel, FIG. 11 shows a detailed view of FIG. 10 of the coupling means, FIG. 12 shows a view corresponding to FIG. 10 in an intermediate position of the vehicle seat, FIG. 13 shows a detailed view of FIG. 12 of the coupling means, FIG. 14 shows a view corresponding to FIG. 10 in the use position of the vehicle seat and FIG. 15 shows a detailed view of FIG. 14 of the coupling means.

A vehicle seat 1 for a rear seat row of a motor vehicle, for example a van, has a seat cushion 3 and a backrest 5 as sub-assemblies. The arrangement of the vehicle seat 1 inside the motor vehicle and the usual direction of travel thereof define the directional information used hereinafter. The vehicle seat 1 may be transferred from an operative use position, i.e. suitable for conveying people, into a folded upright package position, by the backrest 5 being displaced forward and at the same time the seat cushion 3 being folded up. The vehicle seat 1 may also be transferred from the use position into a flat floor position, by the backrest 5 being folded forward and at the same time the seat cushion 3 being lowered. The package position and the flat floor position in each case form a non-use position of the vehicle seat.

The principles of the design of the structure of the vehicle seat 1—provided not otherwise described in detail hereinafter—are already disclosed in WO 02/22391 A1 and DE 10 2005 022 984 A1. The seat cushion 3 has a seat cushion carrier 9 which in its front end region on both sides of the substantially symmetrical vehicle seat 1 is articulated by means of one respective front rocker 10 to a front foot 11.

The vehicle seat 1 is constructed substantially mirror-symmetrically to a central seat plane extending in the direction of travel and the vertical direction. Only one vehicle seat side will be described hereinafter and namely initially in the use position.

Each front foot 11 is connected to a longitudinally adjustable seat rail pair 13 which comprises a first seat rail 13a which is connected directly to the vehicle structure and a second seat rail 13b which is displaceable relative thereto in a longitudinal direction, wherein the two seat rails 13a, 13b of substantially U-shaped profile mutually engage behind one another with their longitudinal edges bent inwardly and/or outwardly and are able to be locked together by means of a rail locking mechanism known per se. Such a seat rail pair with an associated rail locking mechanism is disclosed, for example, in DE 100 50 957 A1.

A rear foot 21 is releasably locked to a locking pin fixedly connected to the second seat rail 13b, by means of a rear lock 25 in the lower part of the rear foot 21. The backrest 5 is attached in each case on one side to the upper rear part of the rear foot 21 by means of a fitting 27, preferably a latching fitting which is adjustable in terms of inclination. The rear foot 21 is articulated in its front part to the front foot 11 by means of a four bar linkage 30. The four bar linkage 30 is defined by a front package rocker 30a, a rear package rocker 30b and the material parts between the points of articulation thereof on the rear foot 21 and on the front foot 11. The pivot axes of the transmission elements of the two four bar linkages 30 on the two vehicle seat sides are aligned with one another. To increase the stability, the two rear feet 21 are connected fixedly together, preferably by a crossmember.

A movement coupler which is not shown in the figures and which is preferably configured to be L-shaped or arcuate, is articulated at one end to the backrest 5 and at the other end to the seat cushion carrier 9. Preferably, a gas spring is articulated, on the one hand, to the front foot 11 and, on the other hand, to the front rocker 10 (or the seat cushion carrier 9) and a tension spring is suspended, on the one hand, on the rear foot 21 and, on the other hand, on the rear package rocker 30b.

For the transfer from the use position into the package position, the rear lock 25 is opened by means of an operating element 43 and the rear foot 21 thereby unlocked. The operating element 43 may be a pivotable lever on the backrest 5 or on the rear foot 21, as shown in the drawings, and/or a tab on the rear foot 21. The transfer into the package position takes place by pressure from the rear onto the backrest 5 and is assisted by the gas spring which forces the seat cushion carrier 9 upwards and the tension spring which pulls the rear foot 21 onto the rear package rocker 30b. The seat cushion 3 performs a pivoting movement upwards, wherein due to the articulation by means of the front rocker 10 only instantaneous centers of rotation are defined and not a fixed rotational axis. The rear foot 21 performs an offset movement which constitutes a superimposition of the pivoting movements of the package rockers 30a and 30b relative to the front foot 11 and of the rear foot 21 relative to the package rockers 30a and 30b. By the offset movement of the rear foot 21 the backrest 5 is also displaced to the front, wherein the backrest 5 is inclined slightly to the front. The movement coupler which generally transmits pressure from the backrest 5 to the seat cushion 3, couples the movements of the seat cushion 3 and the backrest 5 and permits single-handed operation.

On the front foot 11 a securing pin 45 is provided slightly offset to the rear relative to the point of articulation of the front rocker 10, said securing pin protruding outward to the side from the front foot 11. The package position is achieved if the rear foot 21 is positioned on the securing pin 45 and in the present case and preferably the lock 25 is automatically locked to the securing pin 45, i.e. the rear foot 21 is locked to the front foot 11. The package position is automatically secured thereby which increases the protection against loading. The backrest 5 is arranged behind the seat cushion 3 and with its front face faces toward the lower face of the seat cushion 3, i.e. toward the seat cushion carrier 9.

For pivoting back into the use position, the automatic package securing device is unlocked by the operating element 43, i.e. the rear lock 25 is released from the securing pin 45. Preferably by pulling back on the backrest 5 or alternatively by pressing on the seat cushion 3 at the same time the seat cushion 3 is folded down and the backrest 5 displaced to the rear. When reaching the use position the rear lock 25 is locked again to the rear locking pin of the second seat rail 13b.

For the transfer from the use position into the floor position, by means of a further operating element or by a different means of operating the aforementioned operating element 43, for example an actuation of the operating element 43 in the opposing pivoting direction, the fittings 27 are unlocked, i.e. the backrest 5 is unlocked. Whilst when adjusting the inclination of the backrest 5 only very small angular alterations of the backrest 5 are made, the backrest 5 is now pivoted forward into an approximately horizontal flat position. By means of the movement coupler, at the same time the backrest pulls the seat cushion 3, articulated by means of the front rocker 10, downward to the rear (or in a modified embodiment downward to the front), i.e. the seat cushion 3 is lowered. The backrest 5 is thus able to lie on the seat cushion 3 without compressing the cushion, i.e. with its front face on the upper face thereof. The floor position may be ensured by locking the fittings 27. The return into the use position is carried out in the reverse sequence of the steps described.

In order to set a different longitudinal seating position of the vehicle seat 1 which is located in the use position, the rail locking mechanism known per se has to be unlocked, for example in each case a pin mounted in the second seat rail 13b has to be actuated. To this end, on the seat cushion 3 a rail unlocking lever 81 is arranged on the front face, said rail unlocking lever being spring pretensioned and—for example by means of a Bowden cable—being directly or indirectly operatively connected to a rail unlocking bar 85. The rail unlocking bar 85 is arranged perpendicular to the two seat rail pairs 13 extending therebetween or between the two front feet 11 and at its two ends is rotatably mounted on the respective second seat rail 13b or on the front feet 11.

If the seated user actuates the rail unlocking lever 81 which is easily accessible thereto, the rail unlocking bar 85 is rotated and in turn actuates the rail locking mechanism in the known manner. The rail locking device is thereby unlocked and the vehicle seat 1 may be displaced into a different longitudinal seating position. If the rail unlocking lever 81 is released, the spring pretensioning ensures a return of the components into their initial position and thus a locking of the rail locking mechanism.

On at least one end of the rail unlocking bar 85, in the present case at both ends, one respective lever 89, 189 is attached fixedly in terms of rotation. The geometry of the lever 189 fastened to the left-hand end of the rail unlocking bar 85, viewed in the direction of travel, may deviate in detail from the geometry of the lever 89 fastened to the opposing right-hand end of the rail unlocking bar 85, which is why the lever 189 has a reference numeral increased by 100. The same applies to several components connected to the lever 189, which also have reference numerals increased by 100.

If the vehicle seat 1 has been transferred into the package position, it may be desirable to minimize the distance from a seat row arranged in front of said vehicle seat, for which the longitudinal seating position located furthest forward has to be adopted. The rail unlocking lever 81 is no longer accessible to the user in a front package position. In order to be able to unlock the rail locking mechanism, however, in each case a pushbutton 89a, 189a is provided on at least one lever 89, 189, in the present case on both levers 89, 189. The pushbuttons 89a, 189a in each case comprise an arm protruding to the rear relative to the rail unlocking bar 85 (counter to the direction of travel), the seat user may apply a force on the end thereof which transmits an opening moment onto the rail unlocking bar 85, whereby—as described above—the rail locking mechanism is unlocked and the vehicle seat 1 is able to be displaced into a different longitudinal seating position.

In each case a lever end 89b, 189b protruding to the front relative to the rail unlocking bar 85 (in the direction of travel) is shaped on both levers 89, 189, said lever end coupling together the rail locking mechanism and the above described seat kinematic system via coupling means to be described further below, such that the seat rail pair 13 is locked both in the use position and in a non-use position, in the present case the package position of the vehicle seat 1, but is unlocked in at least one intermediate position.

The coupler arranged on the right-hand side of the vehicle seat 1, viewed in the direction of travel, between the rail locking mechanism and the seat kinematic system is described hereinafter initially with reference to FIGS. 4 to 9.

The lever end 89b of the lever 89 is rotatably connected by means of a first pin 101 to a coupler 90.

The coupler 90 designed to be substantially planar and flat comprises a control contour 92 configured as a sliding guide with a first slotted control portion 92a, a second slotted control portion 92b and a catch contour 92c placed between the first control portion 92a and the second control portion 92b.

The first control portion 92a has a straight, elongated contour which extends away from the first pin 101 in an approximately radial direction. The second control portion 92b also has a substantially straight, elongated contour which extends at an angle of approximately 80°, in the present case bent back from the first control portion 92a to the front, i.e. approximately in the direction of the front foot 11. The first control portion 92a and the second control portion 92b merge with one another in a corner region. In this corner region is located the catch contour 92c approximately opposing the first pin 101, said catch contour being configured to be slightly recessed relative to the otherwise straight path of the upper limit of the second control portion 92b.

A second pin 102 extends from the seat outer face through the control contour 92 and is screwed by means of an external thread into an internal thread of the front package rocker 30a. On the end of the second pin 102 remote from the internal thread of the front package rocker 30a, the second pin 102 has a head with a head diameter which is larger than the width of the slotted control contour 92 so that the coupler 90 is axially secured by means of the second pin 102 but is displaceable relative to the control contour 92.

In the use position shown in FIGS. 4 and 5 of the vehicle seat 1 the seat rail pair 13 is locked. The second pin 102 is located in the first control portion 92a and spaced apart from the catch contour 92c. The coupler 90 is pretensioned to the front via a spring, not shown in the figures, about the first pin 101 so that the control contour 92 is pretensioned on the direct path in the direction of the front rocker 10.

The movement sequence of the coupling means when transferred from the use position shown in FIGS. 4 and 5 of the vehicle seat 1 into the intermediate position of the vehicle seat 1 illustrated in FIGS. 6 and 7 is initially described hereinafter.

The vehicle seat 1 is moved from the use position toward its package position. Due to the relative movement between the second pin 102 fastened on the front package rocker 30a and the first pin 101, the second pin 102 moves inside the control contour 92 until it bears against the catch contour 92c of the control contour 92 and thus entrains the coupler 90. As a result, the lever end 89b of the lever 89 rotatably connected to the coupler 90 is pulled and the rail unlocking bar 85 is consequently rotated and the rail locking mechanism unlocked. The vehicle seat 1, therefore, may be displaced in this state.

In the present case, during the movement of the second pin 102 inside the control contour 92, the coupler 90 is slightly pivoted to the front about the first pin 101.

After the second pin 102 has reached the catch contour 92c inside the control contour 92, a further movement of the vehicle seat 1 in the direction of the package position leads to the further pivoting forward of the coupler 90 until said coupler eventually comes to bear against a stop 12 fastened to the front foot 11. This intermediate position is shown in FIGS. 6 and 7.

The vehicle seat 1 is now displaced by means of the seat rail pair 13 further in the direction of the front longitudinally adjusted position of the package position. The second pin 102 remains in this case initially in the catch contour 92c, as a force is produced between the second pin 102 and the catch contour 92c due to self-locking, said force initially not being overcome by a counter force caused substantially by frictional forces between the first seat rail 13a and the second seat rail 13b when displacing the vehicle seat 1 in the longitudinal direction.

After displacing the vehicle seat into a defined position of the longitudinal adjustment, in the present case the front longitudinally adjusted position of the package position, an increased displacement force is present, i.e. a further displacement of the first seat rail 13a relative to the second seat rail 13b requires an increased expenditure of force or is no longer possible due to an end stop, not shown in the figures. This may be implemented, for example, by end stops known per se in the seat rail pair 13. Alternatively, non-positive braking devices known from the prior art are also able to be used.

Due to the increasing displacement force on the vehicle seat 1 the seat user has to apply a greater displacement force on the vehicle seat 1. As a result, a self-locking between the second pin 102 and the catch contour 92c is overcome. The second pin 102 moves into the second control portion 92b until the second pin 102 bears against the end thereof. The front package rocker 30a then reaches its front end position. The coupler 90 in this case is pivoted back counter to the force of the spring about the second pin 102. As a result, the lever end 89b is again moved down and locks the rail locking mechanism via the rail unlocking bar 85. This state is shown in FIGS. 8 and 9.

In a modification of the exemplary embodiment, the stop 12 is not fastened to the front foot 11 but to the first seat rail 13a.

When pivoting back the vehicle seat 1 from the package position into the use position, the second pin 102 runs freely in the control contour 92. The lever 189 arranged on the opposing seat side is connected to a coupler 190 which has a control contour 192 consisting of a first control portion 192a, a second control portion 192b and a catch contour 192c, which acts in the opposing direction (in the direction of the use position) similar to the manner described above. The similar movement sequence is shown in FIGS. 10 to 15. A stop 112 fastened in the region of the rail unlocking bar 85 acts similar to the stop 12.

When pivoting forward the vehicle seat 1 from the use position into the package position, the second pin 102 runs freely in the control contour 192.

The features disclosed in the above description, claims and drawings may be significant both individually and in combination for implementing the invention in its different embodiments.

LIST OF REFERENCE NUMERALS

1 Vehicle seat
3 Seat cushion
5 Backrest
9 Seat cushion carrier
10 Front rocker
11 Front foot
12, 112 Stop
13 Seat rail pair
13a First seat rail
13b Second seat rail
21 Rear foot
25 Rear lock
27 Fitting
30 Four bar linkage
30a Front package rocker
30b Rear package rocker
43 Operating element
45 Securing pin
81 Rail unlocking lever
85 Rail unlocking bar
89, 189 Lever
89a, 189a Pushbutton
89b, 189b Second lever end
90, 190 Coupler
92, 192 Control contour
92a, 192a First control portion
92b, 192b Second control portion
92c, 192c Catch contour 101 First pin
102 Second pin

The invention claimed is:

1. A vehicle seat, comprising:
a seat cushion
a backrest;
a seat kinematic system connecting the seat cushion and/or the backrest to at least one seat rail pair,
wherein the at least one seat rail pair has two seat rails which are displaceable relative to one another and which are able to be locked together by a rail locking mechanism, and
wherein the vehicle seat is able to be transferred by the seat kinematic system from a use position into a non-use position,
wherein a coupler couples together the seat kinematic system and the rail locking mechanism such that the at least one seat rail pair is locked in the use position and in the non-use position of the vehicle seat and is unlocked in an intermediate position of the vehicle seat between the use position and the non-use position,
wherein the seat kinematic system comprises a front foot fastened to the second seat rail of the at least one seat rail pair, a front rocker connecting the front foot and the seat cushion, as well as a rear foot which is able to be releasably fastened to the second seat rail and two package rockers which pivotably articulate the rear foot to the front foot.

2. The vehicle seat as claimed in claim 1, wherein the vehicle seat comprises two seat rail pairs arranged parallel to one another and a rail unlocking bar which is operatively connected to the rail locking mechanisms of the two seat rail pairs such that a rotation of the rail unlocking bar actuates the rail locking mechanisms of the two seat rail pairs.

3. The vehicle seat as claimed in claim 2, wherein the rail unlocking bar extends perpendicular to the two seat rail pairs.

4. The vehicle seat as claimed in claim 2, wherein at least one lever is fastened to the rail unlocking bar, said lever protruding in the radial direction from the rail unlocking bar and having a lever end for cooperating with the coupler.

5. The vehicle seat as claimed in claim 1, wherein the backrest is fastened to the rear foot by a fitting.

6. The vehicle seat as claimed in claim 1, wherein a locking pin is provided on the second seat rail for the rear foot, a lock fastened to the rear foot being able to be locked to said locking pin.

7. The vehicle seat as claimed in claim 1, wherein the coupler has a control contour.

8. The vehicle seat as claimed in claim 7, wherein the coupler is rotatably attached to a lever end of the rail unlocking bar and the control contour is operatively connected to a component of the seat kinematic system.

9. The vehicle seat as claimed in claim 7, wherein the control contour is operatively connected by a control element which is movably guided inside the control contour to one of two package rockers, wherein the control element is a pin.

10. The vehicle seat as claimed in claim 1, wherein the coupler includes a first coupler and a second coupler, wherein the first coupler is provided for the transfer of the vehicle seat from the use position into the non-use position and the second coupler is provided for the transfer from the non-use position into the use position.

11. The vehicle seat as claimed in claim 10, wherein each of the first coupler and the second coupler is only effective in each case in one of two transfer directions.

12. A vehicle seat, comprising:
a seat cushion
a backrest;
a seat kinematic system connecting the seat cushion and/or the backrest to at least one seat rail pair,
wherein the at least one seat rail pair has two seat rails which are displaceable relative to one another and which are able to be locked together by a rail locking mechanism, and
wherein the vehicle seat is able to be transferred by the seat kinematic system from a use position into a non-use position,
wherein a coupler couples together the seat kinematic system and the rail locking mechanism such that the at least one seat rail pair is locked in the use position and in the non-use position of the vehicle seat and is unlocked in an intermediate position of the vehicle seat between the use position and the non-use position,
wherein the coupler has a control contour,
wherein the coupler is rotatably attached to a lever end of the rail unlocking bar and the control contour is operatively connected to a component of the seat kinematic system,
wherein the control contour is operatively connected by a control element which is movably guided inside the control contour to one of two package rockers, wherein the control element is a pin.

13. The vehicle seat as claimed in claim 12, wherein the control contour comprises a slot-shaped first control portion, a slot-shaped second control portion and a catch contour positioned between the first control portion and the second control portion.

14. The vehicle seat as claimed in claim 13, wherein when the vehicle seat is transferred from the use position into the non-use position or when transferred from the non-use position into the use position in a first phase of a movement sequence the control element is moved in the first control portion until it comes to bear against the catch contour and in a second phase of the movement sequence the control element entrains the catch contour and thus the coupler.

15. The vehicle seat as claimed in claim 14, wherein at an end of the second phase of the movement sequence the coupler pivots against a stop and, as a result, in a further movement sequence the control element leaves the catch contour and enters the second control portion, wherein the coupler pivots back about the control element in the direction of its initial position.

* * * * *